United States Patent
Sakamoto et al.

(10) Patent No.: US 8,102,249 B2
(45) Date of Patent: Jan. 24, 2012

(54) STARTING CONTROL APPARATUS AND STARTING CONTROL METHOD

(75) Inventors: Takeshi Sakamoto, Kobe (JP); Yasuo Ono, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 924 days.

(21) Appl. No.: 12/153,162

(22) Filed: May 14, 2008

(65) Prior Publication Data

US 2009/0045912 A1 Feb. 19, 2009

(30) Foreign Application Priority Data

May 14, 2007 (JP) ................................ 2007-128143

(51) Int. Cl.
    *B60R 25/10* (2006.01)
(52) U.S. Cl. ................ 340/426.11; 340/540; 340/425.5; 340/5.64; 701/113
(58) Field of Classification Search ............. 340/426.11, 340/540, 425.5, 425.22, 5.64, 5.6; 701/48, 701/113
    See application file for complete search history.

(56) References Cited

U.S. PATENT DOCUMENTS

| | | | | |
|---|---|---|---|---|
| 5,982,292 A | * | 11/1999 | Tagawa et al. | 340/5.64 |
| 6,154,132 A | * | 11/2000 | Iwamoto et al. | 340/540 |
| 6,249,731 B1 | * | 6/2001 | Miller et al. | 701/48 |
| 7,031,826 B2 | * | 4/2006 | Flick | 701/113 |
| 7,391,131 B2 | * | 6/2008 | Ono et al. | 307/10.6 |
| 2006/0175900 A1 | | 8/2006 | Ono et al. | |

FOREIGN PATENT DOCUMENTS

| | | |
|---|---|---|
| JP | A 2004-36505 | 2/2004 |
| JP | A 2004-132273 | 4/2004 |
| JP | A 2004-345472 | 12/2004 |
| JP | A 2006-192917 | 7/2006 |
| JP | A 2006-213161 | 8/2006 |
| JP | A 2006-213247 | 8/2006 |

\* cited by examiner

*Primary Examiner* — Benjamin C Lee
*Assistant Examiner* — Peter Mehravari
(74) *Attorney, Agent, or Firm* — Oliff & Berridge, PLC (57) ABSTRACT

An immobilizer type outputting part outputs information indicating that no immobilizer device is provided in the vehicle to an immobilizer-installed body ECU or a body ECU through an in-vehicle communication network in the case where an immobilizer type identification part of a remote start ECU judges that no immobilizer device is provided in the vehicle. In the case where the immobilizer type identification part judges that the immobilizer device is provided in the vehicle, the immobilizer type output part outputs information indicating the type of the immobilizer device to the immobilizer-installed body ECU or the body ECU through the in-vehicle communication network.

9 Claims, 10 Drawing Sheets

STARTING CONTROL APPARATUS AND STARTING CONTROL METHOD

BACKGROUND OF THE INVENTION

1. Field of the Invention

The present invention relates to a starting control apparatus and method for carrying out starting control of a vehicle.

2. Description of the Related Art

A starting control apparatus has been put to practical use that is for starting an engine remotely or at a predetermined time by means of a timer for the purpose of warming up and air conditioning of the vehicle in advance under the circumstance that a driver is outside the vehicle. Such a starting control apparatus operates a starter motor similarly to a case where a manual engine starting operation by means of a key is performed when the starting control apparatus receives an engine starting request signal sent from a remote control terminal (a remote key) carried by a driver, for example. This causes the engine control apparatus to execute spray of fuel.

The starting control apparatus is additionally mounted in some cases after a vehicle is sold. In the case of additionally mounting the starting control apparatus to a vehicle to which a so-called immobilizer device is mounted, the immobilizer device being for controlling permission of starting of an engine in accordance with verification of a specific identification code (referred to as a "code for certification", hereinafter) for releasing prohibition of starting of the engine only when certification of a key is succeeded, it is required to register in the starting control apparatus a code for certification for releasing prohibition of starting of the engine by means of an immobilizer device, send a code for certification to the immobilizer device before starting control is carries out, and then, release prohibition of starting.

A technology relating to such a starting control apparatus is disclosed in Japanese Unexamined Patent Publication JP-A 2004-36505 and Japanese Unexamined Patent Publication JP-A 2004-132273, for example. JP-A 2004-36505 discloses an engine starting system with an immobilizer adapter for feeding codes to an ECU in place of an immobilizer, allowing easy initial registration and update registration of the codes. JP-A 2004-132273 discloses an engine control apparatus with an immobilizer system, which compares and collates a transmitted identification code with a preliminarily registered identification code when the engine key is inserted in a key cylinder.

As a method of starting an engine, adopted has been a turning method in which a key is inserted into a key cylinder and turned. Further, a so-called push start method in which a button operation is carried out to start an engine without using any key has been begun to be adopted as the method of starting an engine.

In the case where the starting control apparatus is additionally mounted to a vehicle, contents of control, which relate to starting of an engine, such as a method of starting an engine and a method of sending a code for certification to an immobilizer device are different in some cases in accordance with a structure of the vehicle. As for the structure of a vehicle, there are four structures A, B, C and D in accordance with whether the a method of starting an engine is the push start method or the turning method and presence or absence of an immobilizer device, as shown in Table 1. In the structure A, the push start method is adopted and an immobilizer device is provided. In the structure B, the turning method is adopted and an immobilizer device is provided. In the structure C, the push start method is adopted and no immobilizer device is provided. In the structure D, the turning method is adopted and no immobilizer device is provided. The immobilizer device used in the push start method like the structure A is occasionally referred to as a "push start type immobilizer device", hereinafter. Further, the immobilizer device used in the turning method like the structure B is occasionally referred to as a "turning type immobilizer device", hereinafter.

TABLE 1

| STARTING METHOD | PRESENCE OR ABSENCE OF IMMOBILIZER | |
|---|---|---|
| | PRESENCE | ABSENCE |
| PUSH START METHOD | A | C |
| TURNING METHOD | B | D |

In the case of mounting a starting control apparatus deferent for every structure of a vehicle, as described above, caused is a problem that a cost in manufacturing the starting control apparatus increases.

In order to solve the problem, in the case of mounting the starting control apparatus corresponding to all of the structures A to D of a vehicle, which are shown in Table 1, an operator who performs an operation of mounting the starting control apparatus onto the vehicle in a factory or the like should confirm whether the immobilizer device is provided to the vehicle or not and a type of the immobilizer device provided in the vehicle, a structure of the vehicle such as the push start type immobilizer device and the turning type immobilizer device, for example, in mounting the starting control apparatus, referring to a specification of the vehicle and the like. Moreover, the operator has to carry out a predetermined specific operation after such a confirmation operation described above in mounting the starting control apparatus onto the vehicle, and make the settings relating to starting of the engine such as registration of the code for certification of the immobilizer device for the starting control apparatus in the mounting operation.

In the case where the vehicle comprises the turning type immobilizer device like the structure B, for example, the operator should make the settings so that the starting control apparatus would start when a permission signal for permitting starting of the engine is received from the immobilizer device. The operation of confirming the structure of the vehicle with reference to a specification of the vehicle and the like, however, is complicated and troublesome. Accordingly, some operators recognize a wrong structure of the vehicle by mistake, in some cases.

When the operator recognizes by mistake that the vehicle is of the structure D with no immobilizer device although the vehicle is actually of the structure B, the setting results in disregard of the permission signal from the immobilizer device. This causes the starting control apparatus to operate a starter motor of the engine with the permission signal being ignored regardless of presence or absence of the permission signal from the immobilizer device when an instruction of starting the engine is received. Accordingly, there is a problem that the starter motor undesirably operates even when the permission signal is not received from the immobilizer device and this imposes a burden on the vehicle.

SUMMARY OF THE INVENTION

An object of the invention is to provide a starting control apparatus and method capable of judging a structure of a vehicle to which the starting control apparatus or method is mounted and letting an operator clearly recognize a result of the judgment.

In accordance with the invention, a judging portion judges whether an immobilizer device which controls permission of starting of an engine based on verification of a specific identification code is provided in the vehicle or not. When it is judged in the judging portion that the immobilizer device is provided in the vehicle, the judging portion further judges the type of the immobilizer device provided in the vehicle.

An output portion outputs information indicating that the immobilizer device is not provided in the vehicle when the judging portion judges that no immobilizer device is provided in the vehicle, and outputs information indicating the type of the immobilizer device, for example, a push start type immobilizer device or a turning type immobilizer device, when it is judged in the judging portion that the immobilizer device is provided in the vehicle.

In accordance with the invention, information indicating that the immobilizer device is not provided in the vehicle is outputted by means of the output portion when the judging portion judges that no immobilizer device is provided in the vehicle while information indicating the type of the immobilizer device, a push start type immobilizer device or a turning type immobilizer device, for example, is outputted by means of the output portion when it is judged in the judging portion that the immobilizer device is provided in the vehicle.

Accordingly, an operator who carries out an operation of mounting the starting control apparatus onto the vehicle can clearly recognize whether the immobilizer device is provided in the vehicle or not and the type the immobilizer device provided in the vehicle, the structure of the vehicle such as the push start type immobilizer device and the turning type immobilizer device, for example, based on information outputted by the output portion. This allows the operator to be prevented from carrying out a wrong operation due to wrong recognition of the structure of the vehicle to undesirably impose a burden on the vehicle.

BRIEF DESCRIPTION OF THE DRAWINGS

Other and further objects, features, and advantages of the invention will be more explicit from the following detailed description taken with reference to the drawings wherein.

DETAILED DESCRIPTION

Now, described hereinafter will be plural embodiments for carrying out the invention with reference to the drawings. In each embodiment, parts corresponding to items described in a preceding embodiment are denoted by the same reference signs and numerals and repeated description will be omitted in some cases. In the case of describing only one part of a structure, the other part of the structure is assumed to be same as a part in a precedently described embodiment.

Figure 1:
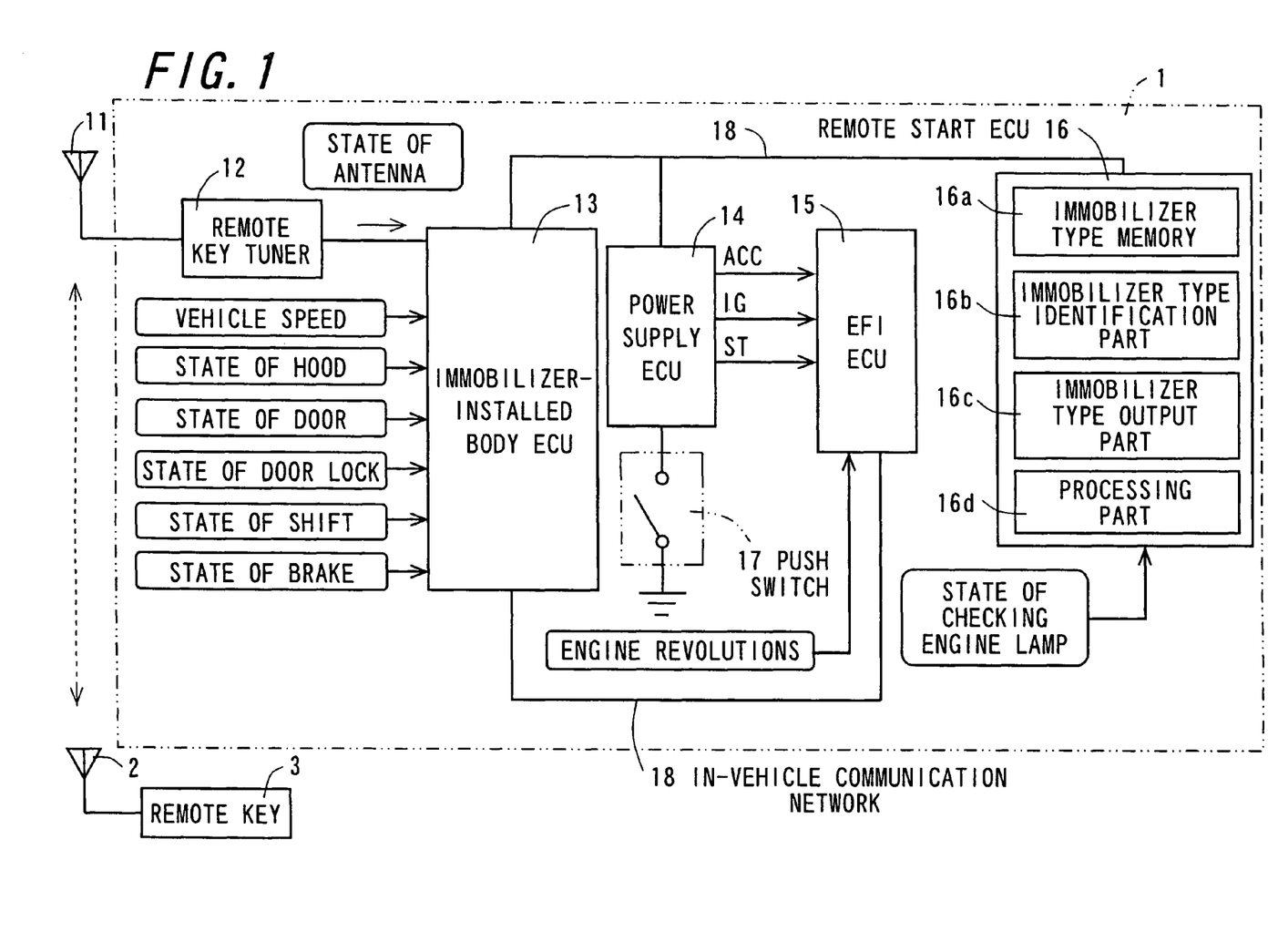
FIG. 1 is a block diagram showing a structure of an on-vehicle system including a starting control apparatus in accordance with an embodiment of the invention.

FIG. 1 is a block diagram showing a structure of an on-vehicle system 1 including a starting control apparatus 16 in accordance with an embodiment of the invention. The on-vehicle system 1 is arranged so as to start an engine in the so-called push start method in which a button operation is carried out without using a key to start an engine. The vehicle system 1 is arranged so as to include an antenna 11, a remote key tuner 12, an immobilizer-installed body ECU (electronic control unit) 13, a power supply ECU 14, an EFI (electronic fuel injection) ECU (a fuel injection control device) 15, a starting control apparatus (occasionally referred to as a "remote start ECU", hereinafter) 16 and a push switch 17.

The remote key tuner 12 is connected to antennas 11 provided in plural numbers respectively inside and outside a vehicle. In FIG. 1, shown is only one antenna 11 for the purpose of easy understanding. The remote key tuner 12 communicates with a remote key 3 provided with an antenna 2 through the antenna 11. The remote key tuner 12 outputs a receiving signal from the remote key 3 and information indicating which antenna 11 receives the signal. The remote key 3 is an identification code holding portion having a specific identification code. The remote key 3 is a mobile terminal for remote control, the mobile terminal being carried by a user. The remote key 3 sends to the on-vehicle system 1 an engine start request signal indicating a request for starting the engine, an engine stop request signal indicating a request for stopping the engine, a locking request signal indicating a request for locking a door, a locking release request signal indicating a request for releasing locking of a door and such.

The immobilizer-installed body ECU 13 has a function as a control device for controlling a state of the vehicle and a function as an immobilizer device for controlling permission of starting of an engine in accordance with verification with a specific identification code.

The immobilizer-installed body ECU 13 is provided with a connection terminals for electrically connecting with a sensor and a switch, which are provided in the vehicle. The connection terminals provided in the immobilizer-installed body ECU 13 are electrically connected respectively to a vehicle speed sensor, a hood switch, a door opening and closing switch, a door locking switch, a shift switch and a brake switch, which are provided in the vehicle.

The immobilizer-installed body ECU 13 can identify a vehicle speed by receiving a detection signal from the vehicle speed sensor. Further, the immobilizer-installed body ECU 13 can identify an opening and closing state of a hood in an engine compartment, an opening and closing state of the door, a locking state of the door, a state of a shift (a transmission) and a state of a brake by receiving signals indicating an opening and closing condition of each switch from the hoof switch, the door opening and closing switch, the door locking switch, the shift switch and the brake switch.

The immobilizer-installed body ECU 13 is connected to the remote key tuner 12 and an in-vehicle communication network 18 to output inputted information to the in-vehicle communication network 18. The in-vehicle communication network 18 is put into practice, using a CAN (a controller area network), which is a serial communication protocol, for example. The immobilizer-installed body ECU 13 is connected to the power supply ECU 14, the EFI ECU 15 and the remote start ECU 16 through the in-vehicle communication network 18 so as to be capable of communication.

The immobilizer-installed body ECU 13 judges whether the remote key 3 is in the vehicle or not based on an output signal from the remote key tuner 12, that is, based on a signal from the remote key 3, which is received by the antenna 11. The immobilizer-installed body ECU 13 also carries out control of a state of the vehicle, prohibition of starting of the engine and release of the prohibition of starting of the engine. Moreover, the immobilizer-installed body ECU 13 electronically confirms whether the remote key 3 is proper or not in accordance with verification with an identification code held by the remote key 3.

The power supply ECU 14 is connected to the in-vehicle communication network 18 and the push switch 17. The power supply ECU 14 is a control device responsible for starting control of the EFI ECU 15, which will be mentioned later. The power supply ECU 14 carries out control of an accessory line (ACC), an ignition line (IG) and a starter line (ST) in accordance with an operation of the push switch 17 by a user.

The EFI ECU 15 is a control device for electronically controlling an operation of the engine. The EFI ECU 15 obtains information relating to a state of the engine, for example, engine revolutions, to use the obtained information for the purpose of controlling the engine. The EFI ECU 15 is connected to the in-vehicle communication network 18, and communicates with the immobilizer-installed body ECU 13, the power supply ECU 14 and the remote start ECU 16 through the in-vehicle communication network 18. The EFI ECU 15 receives output information from each ECU and sends inputted information to each ECU.

The remote start ECU 16 in the embodiment carries out a process of starting the engine in a state where the remote key 3 is not in the vehicle. At that time, the remote start ECU 16 uses an identification code stored in advance in a non-volatile memory (not shown) to release prohibition of starting of the engine by the immobilizer-installed body ECU 13. In the non-volatile memory built in the remote start ECU 16, further stored are a starting process program for starting an engine in the push start method and a starting process program for starting an engine in the turning method in which a key is inserted into a key cylinder to be turned.

The remote start ECU 16 is arranged to include an immobilizer type memory 16a, an immobilizer type identification part 16b, an immobilizer type output part 16c and a processing part 16d. The remote start ECU 16 further includes a control part. The control part is put into practice with a processing circuit such as a central processing unit (abbreviated to CPU). The control part controls operations of the immobilizer type memory 16a, the immobilizer type identification part 16b, the immobilizer type output part 16c and the processing part 16d in accordance with control programs stored in the non-volatile memory built in the remote start ECU 16.

The immobilizer type memory 16a stores information indicating types of the immobilizer devices provided in the plural vehicles. The type of the immobilizer device includes an immobilizer device for vehicle with push start smart system and an immobilizer device for vehicle without push start smart system. The immobilizer type identification part 16b, which is described later, judges whether the immobilizer device is provided in the vehicle or not. In the case where the type of the immobilizer device is not judged, the immobilizer type memory 16a stores information indicating that the immobilizer type identification part 16b has not yet carried out the judgment (occasionally referred to as "undecided information", hereinafter).

The immobilizer device for vehicle with push start smart system controls permission of starting of the engine in accordance with verification with the specific identification code. Concretely, the immobilizer device for vehicle with push start smart system is an immobilizer device in a method that starting of the engine is controlled to be permitted when an identification code obtained from the remote key 3, which is a mobile terminal for remote control, accords with a predetermined identification code and that an operation of the push switch by a user causes the engine to start. The immobilizer device for vehicle with push start smart system is used in the on-vehicle system 1 in which the push switch 17 is provided in the vehicle. The immobilizer device for vehicle with push start smart system is occasionally referred to as an "immobilizer device for push start method", hereinafter, since it is an immobilizer device used in the push start method, which is a method of starting an engine.

The immobilizer device for vehicle without push start smart system controls permission of starting of the engine in accordance with verification with the specific identification code. Concretely, the immobilizer device for vehicle without push start smart system is an immobilizer device in a method that the engine is permitted to start when an identification code obtained from the key of the vehicle, the key being an identification code holding portion holding the specific identification code, accords with a predetermined identification code. The immobilizer device for vehicle without push start smart system is used in a later-mentioned on-vehicle system 21 provided in the vehicle with no push switch 17 shown in FIG. 1. The immobilizer device for vehicle without push start smart system is occasionally referred to as an "immobilizer device for turning method", hereinafter, since it is an immobilizer device used in the turning method, which is a method of starting the engine.

The immobilizer type identification part 16b judges whether the immobilizer device is provided in the vehicle or not, and, when it is judged that the immobilizer device is provided in the vehicle, judges a type of the immobilizer device provided in the vehicle based on information indicating the type of the immobilizer device, the information stored in the immobilizer type memory 16a. The method how the immobilizer type identification part 16b judges whether the immobilizer device is provided in the vehicle or not as well as a type of the immobilizer device provided in the vehicle will be described later.

The immobilizer type output part 16c outputs a result of the judgment made by the immobilizer type identification part 16b to the immobilizer-installed body ECU 13 through the in-vehicle communication network 18. The immobilizer-installed body ECU 13 reports the result of the judgment made by the immobilizer type identification part 16b, the result given from the remote start ECU 16 through the in-vehicle communication network 18, to an operator carrying out an operation of mounting the remote start ECU 16 onto the vehicle in a factory and such by blinking an emergency blinking indication lamp provided in the vehicle by the predetermined number of times or by outputting sound at predetermined time intervals by means of an alarming horn provided in the vehicle.

The processing part 16d executes a starting process according to a structure of the vehicle based on the result of the judgment made by the immobilizer type identification part 16b. In concrete description, the processing part 16d selects and executes a starting process program stored in a non-volatile memory built in the remote start ECU 16 in accordance with the result of the judgment made by the immobilizer type identification part 16b.

Moreover, when the operator performs a predetermined operation such as an operation of inserting and pulling a key 4 into and from a key cylinder 25 and an operation of opening and closing a door, by a predetermined number of times, the processing part 16d of the remote start ECU 16 in the on-vehicle system 1 changes a mode from an ordinary operation mode for carrying out a process of starting the engine in a state where the remote key 3 is not in the vehicle, to a registration mode for registering an identification code for certification of the remote key 3 in the remote start ECU 16 to set the latter mode.

In the on-vehicle system 1, the immobilizer type identification part 16b of the remote start ECU 16 corresponds to a judgment portion. The immobilizer type outputting part 16c and the immobilizer-installed body ECU 13 of the remote start ECU 16 correspond to an output portion. The processing part 16d of the remote start ECU 16 corresponds to a control portion.

Now, described will be starting of an engine in accordance with an operation of the push switch 17. First, the immobilizer-installed body ECU 13 certifies the remote key 3 when the remote key tuner 12 communicates with the remote key 3 and the immobilizer-installed body ECU 13 detects that the remote key 3 is in the vehicle. In the case where the certification is succeeded, the immobilizer-installed body ECU 13 gives permission of starting of the engine to the EFI ECU 15 to release prohibition of starting of the engine. The power supply ECU 14 controls the accessory line (ACC), the ignition line (IC) and the starter line (ST) to start the engine when a user operates the push switch 17.

Now, described will be starting of an engine by means of the remote start ECU 16 in the on-vehicle system 1. First, the remote key tuner 12 receives an engine start request signal sent from the remote key 3 to the on-vehicle system 1. The remote key tuner 12 gives the received engine start request signal to the remote start ECU 16 through the immobilizer-installed body ECU 13 and the in-vehicle communication network 18. The remote start ECU 16 receives the start request signal from the remote key tuner 12 to give the immobilizer-installed body ECU 13 a release request signal indicating a request for releasing prohibition of starting of the engine through the in-vehicle communication network 18.

The immobilizer-installed body ECU 13 receives the release request signal from the remote start ECU 16 to perform certification of the remote start ECU 16. In the case where the certification is succeeded, the immobilizer-installed body ECU 13 gives the EFI ECU 15 permission of starting of the engine to inform the remote start ECU 16 of release of prohibition of starting of the engine. The remote start ECU 16 then outputs an instruction of an operation to the power supply ECU 14. The power supply ECU 14 operates the accessory line (ACC), the ignition line (IG) and the starter line (ST) to start the engine when it receives the instruction of an operation from the remote start ECU 16.

Figure 2:
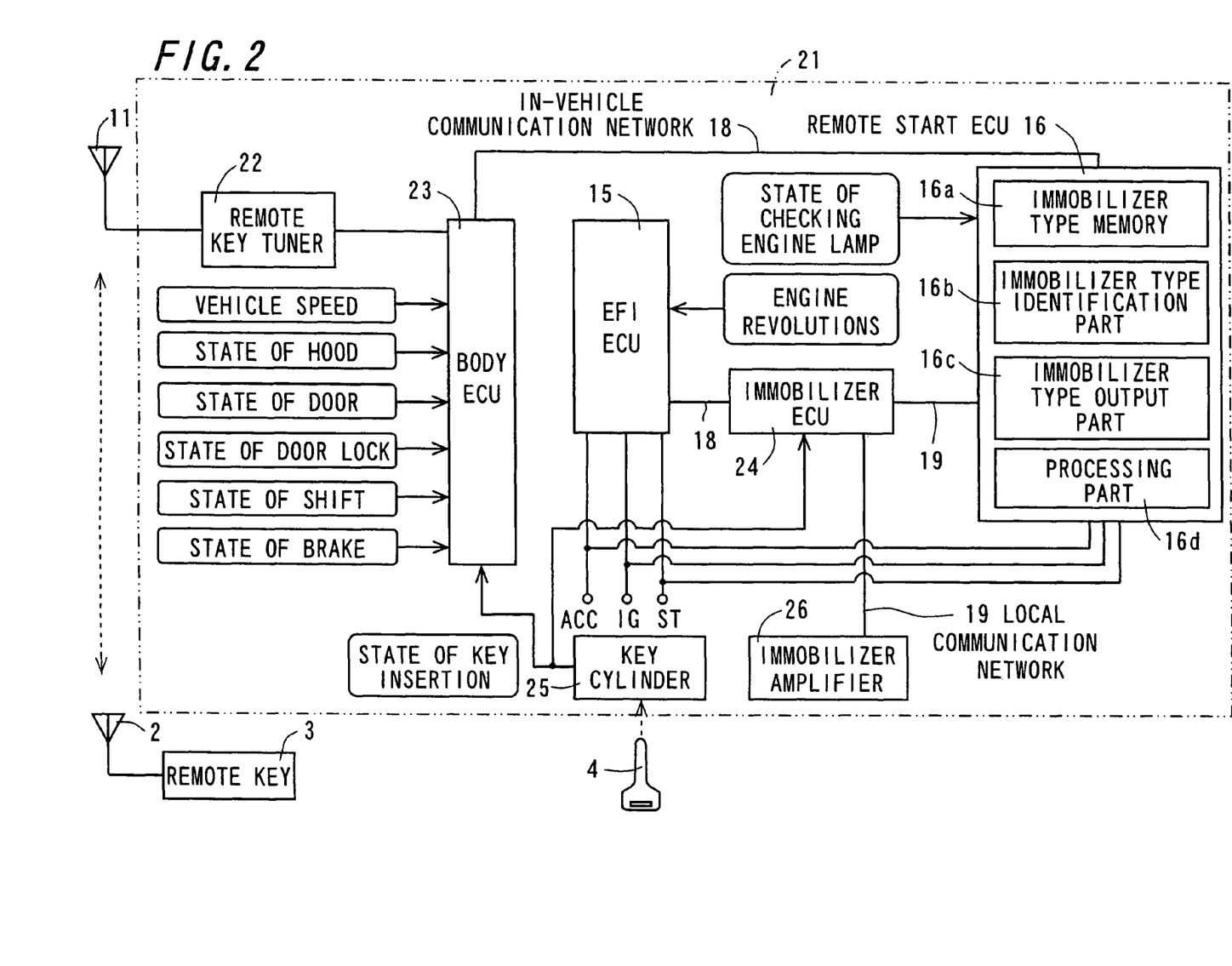
FIG. 2 is a block diagram showing a structure of an on-vehicle system including the starting control apparatus in accordance with the embodiment of the invention.

FIG. 2 shows a block diagram showing a structure of an on-vehicle system 21 including the starting control apparatus 16 in accordance with the embodiment of the invention. The on-vehicle system 21 is arranged so as to start an engine in the turning method in which a key is inserted into a key cylinder to be turned. The on-vehicle system 21 is similar in structure to the on-vehicle system 1 in the embodiment shown in FIG. 1. Accordingly, corresponding parts are denoted by the same reference signs and numerals and common description is omitted. The on-vehicle system 21 is arranged so as to include an antenna 11, a remote key tuner 22, a body ECU 23, an EFI ECU (a fuel injection control device) 15, a remote start ECU 16, an immobilizer ECU 24, a key cylinder 25 and an immobilizer amplifier 26.

The remote key tuner 22 carries out communication with the remote key 3 provided with the antenna 2 through the antenna 11. The remote key 3 sends to the on-vehicle system 21 an engine start request signal indicating a request for starting the engine and an engine stop request signal indicating a request for stopping the engine. Further, the remote key 3 may be arranged to send a locking request signal indicating a request for locking a door, a locking release request signal indicating a request for releasing locking of a door and such to the on-vehicle system 21. The key 4 is used when a user directly carries out an operation of starting the engine. The key 4, however, may be arranged to also have a function as the remote key 3.

The body ECU 23 is a control device for controlling a state of a vehicle. The body ECU 23 is provided with connection terminals electrically connected to a sensor and a switch, which are provided in the vehicle. The connection terminals provided in the body ECU 23 are electrically connected respectively to a vehicle speed sensor, a hood switch, a door opening and closing switch, a door locking switch, a shift switch and a brake switch, which are provided in the vehicle.

The body ECU 23 can identify a vehicle speed by receiving a detection signal from the vehicle speed sensor. Further, the body ECU 23 can identify an opening and closing state of a hood in an engine compartment, an opening and closing state of the door, a locking state of the door, a state of shift (a transmission) and a state of a brake by receiving a signal indicating an opening and closing condition of each switch from the hoof switch, the door opening and closing switch, the door locking switch, the shift switch and the brake switch.

The body ECU 23 is connected to the remote key tuner 22 and the in-vehicle communication network 18 to output inputted information to the in-vehicle communication network 18. The body ECU 23 is connected to the EFI ECU 15 and the remote start ECU 16 through the in-vehicle communication network 18 so as to be capable of communication.

The EFI ECU 15 of the on-vehicle system 21 is connected to the immobilizer ECU 24 through the in-vehicle communication network 18 so as to be capable of communication. In the key 4, which is a key of the vehicle, built is a transponder in which a specific identification code is stored. The key 4 outputs an identification code stored therein in response to a radio wave radiated from an antenna provided in the key cylinder 25. When the key 4 is inserted into the key cylinder 25, the key cylinder 25 gives the body ECU 23 and the immobilizer ECU 24 a key insertion signal indicating that the key 4 is inserted.

The immobilizer ECU 24 detects the insertion of the key 4 into the key cylinder 25 based on the key insertion signal to read out an identification code built in the key 4, and then, carries out certification. The immobilizer ECU 24 prohibits starting of the engine in the case of failing in the certification. The immobilizer ECU 24 releases prohibition of starting of the engine in the case of success in certification to function as an immobilizer device for preventing the vehicle from being stolen by illegally starting the engine. The immobilizer ECU 24 is connected to the remote start ECU 16 and the immobilizer amplifier 26 through a local communication network 19 provided in the vehicle independently from the EFI ECU 15 so as to be capable of communication.

The immobilizer type output part 16c of the remote start ECU 16 in the on-vehicle system 21 outputs a result of the judgment made by the immobilizer type identification part 16b. The immobilizer type output part 16c gives the body ECU 23 the outputted result of the judgment through the in-vehicle communication network 18. The body ECU 23 reports the result of the judgment made by the immobilizer type identification part 16*b* to the operator in accordance with the result of the judgment made by the immobilizer type identification part 16*b*, the result given from the remote start ECU 16, by blinking an emergency blinking indication lamp by the predetermined number of times or by outputting sound at predetermined time intervals by means of an alarming horn, for example.

When the operator performs a predetermined operation such as an operation of inserting and pulling a key 4 into and from a key cylinder 25 and an operation of opening and closing a door, by a predetermined number of times, the processing part 16*d* of the remote start ECU 16 in the on-vehicle system 21 changes a mode from an ordinary operation mode for carrying out a process of starting the engine in a state where the remote key 3 is not in the vehicle, to a registration mode for registering an identification code for certification of the key 4 in the remote start ECU 16 to set the latter mode.

In the on-vehicle system 21, the immobilizer type identification part 16*b* of the remote start ECU 16 corresponds to the judgment portion. The immobilizer type outputting part 16*c* and the body ECU 23 of the remote start ECU 16 correspond to the output portion. The processing part 16*d* of the remote start ECU 16 corresponds to the control portion.

Now, described will be an operation of releasing prohibition of starting of the engine by means of the immobilizer ECU 24. First, the key cylinder 25 detects insertion of the key 4 to give the immobilizer ECU 24 the key insertion signal. The immobilizer ECU 24 receives the key insertion signal to give the immobilizer amplifier 26, which is connected through the local communication network 19 so as to be capable of communication, a code sending request signal indicating a request for sending an identification code built in the key. The immobilizer amplifier 26 receives the code sending request signal from the immobilizer ECU 24 and carries out radio communication with the key 4. The immobilizer amplifier 26 thus reads an identification code stored in a transponder built in the key 4 to send the code to the immobilizer ECU 24.

The immobilizer ECU 24 judges whether the identification code received from the immobilizer amplifier 26 accords with the identification code stored in the immobilizer ECU 24 in advance or not. In the case of accord, the immobilizer ECU 24 judges that the certification is succeeded to give the EFI ECU 15 permission of starting. This allows prohibition of starting of the engine to be released.

Accordingly, the immobilizer ECU 24 releases prohibition of starting of the engine when a user inserts the regular key 4 into the key cylinder 25. When the user turns the key 4 to operate the ignition (IG) line and the starter (ST) line or the accessory (ACC) line for controlling power supply to an on-vehicle device, and then, the starter motor is driven, the EFI ECU 15 carries out fuel control and ignition control, for example, to start the engine.

In the case where the user inserts an illegal key into the key cylinder 25, the identification code received by the immobilizer ECU 24 from the immobilizer amplifier 26 is not accorded with the identification code stored in advance in the immobilizer ECU 24, that is to say, certification of the identification code is in fail. The EFI ECU 15 is in a state of prohibition of starting at that time. Accordingly, even carrying out an operation of turning the key to drive the starter motor causes neither an operation of the EFI ECU 15 nor starting of the engine.

Now, described will be starting of the engine by means of the remote start ECU 16 in the on-vehicle system 21. First, the remote key tuner 22 receives an engine start request signal sent from the remote key 3 to the on-vehicle system 21. The remote key tuner 22 gives the received engine start request signal to the remote start ECU 16 through the body ECU 23 and the in-vehicle communication network 18. The remote start ECU 16 receives the start request signal from the remote key tuner 22 to give the immobilizer ECU 24 a release request signal indicating a request for releasing prohibition of starting of the engine through the local communication network 19.

The immobilizer ECU 24 receives the release request signal from the remote start ECU 16 to perform certification of the remote start ECU 16. In the case where the certification is succeeded, the immobilizer ECU 24 gives the EFI ECU 15 permission of starting of the engine to inform the remote start ECU 16 of release of prohibition of starting of the engine. The remote start ECU 16 then operates the accessory line (ACC), the ignition line (IG) and the starter line (ST) and outputs respective pseudo signals to control starting of the engine.

Figure 3:
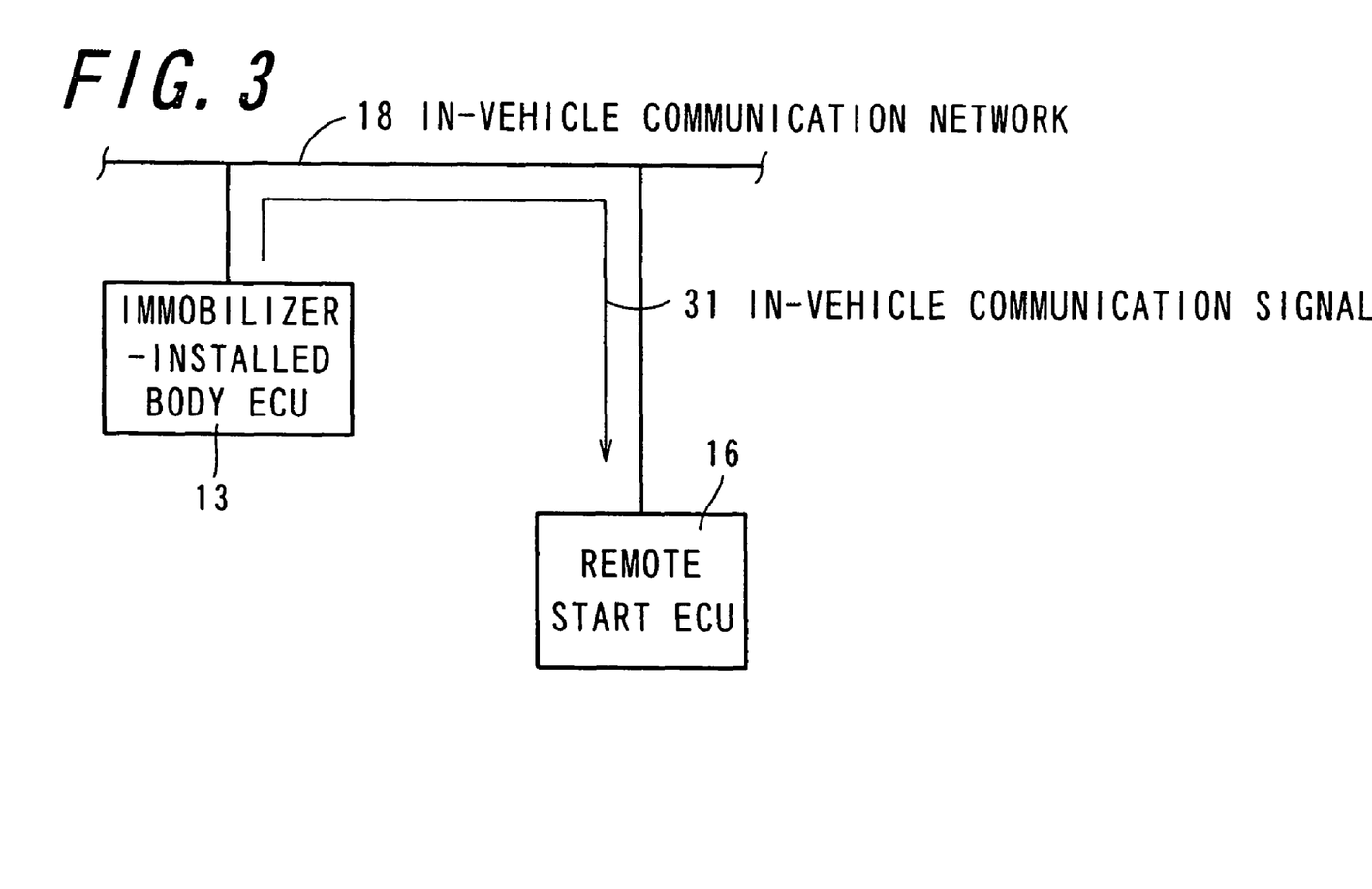
FIG. 3 is a view showing the immobilizer-installed body ECU and the remote start ECU, which are connected through an in-vehicle communication network.
Figure 4:
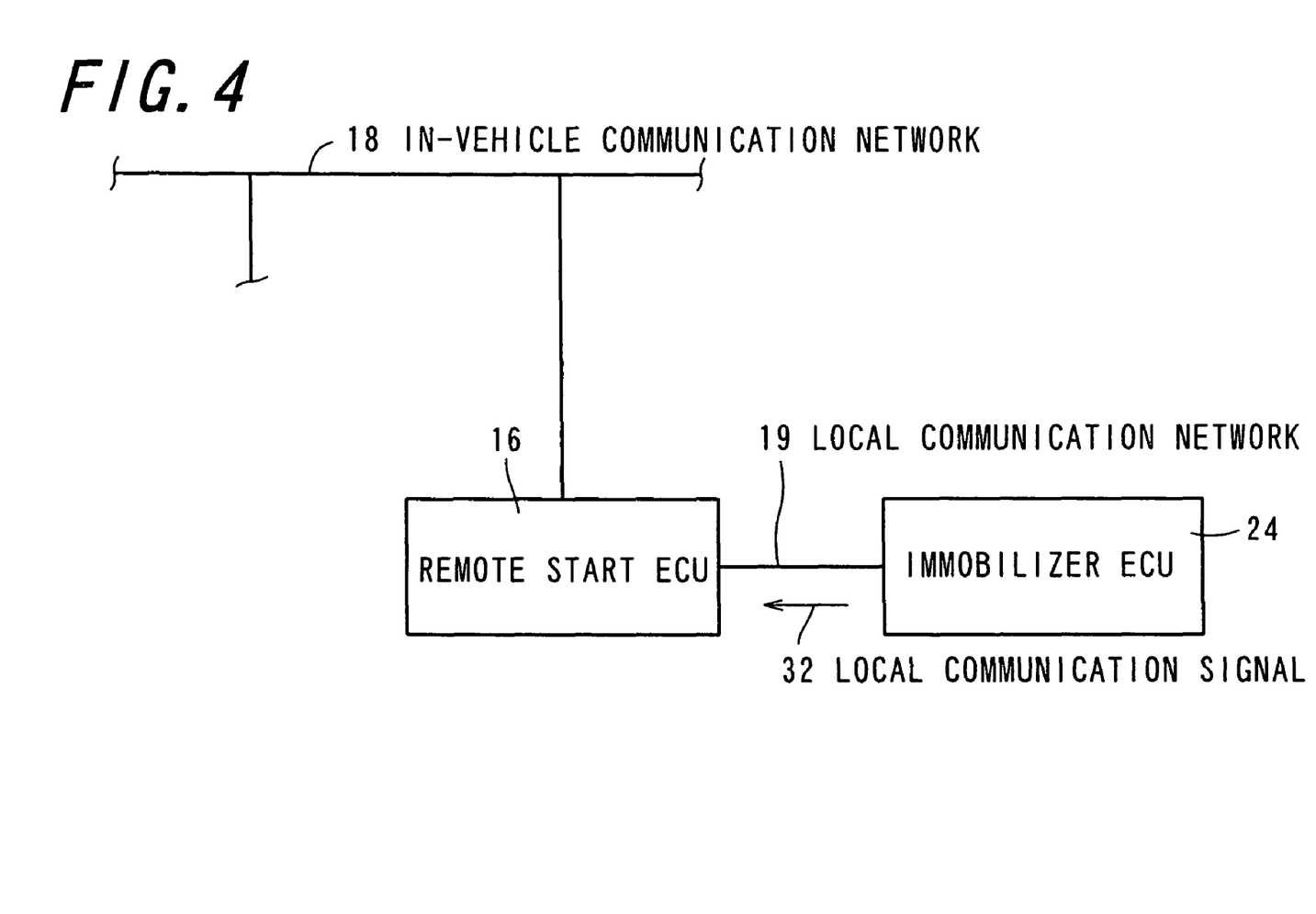
FIG. 4 is a view showing the remote start ECU and the immobilizer ECU, which are connected through a local communication network.
Figure 5:
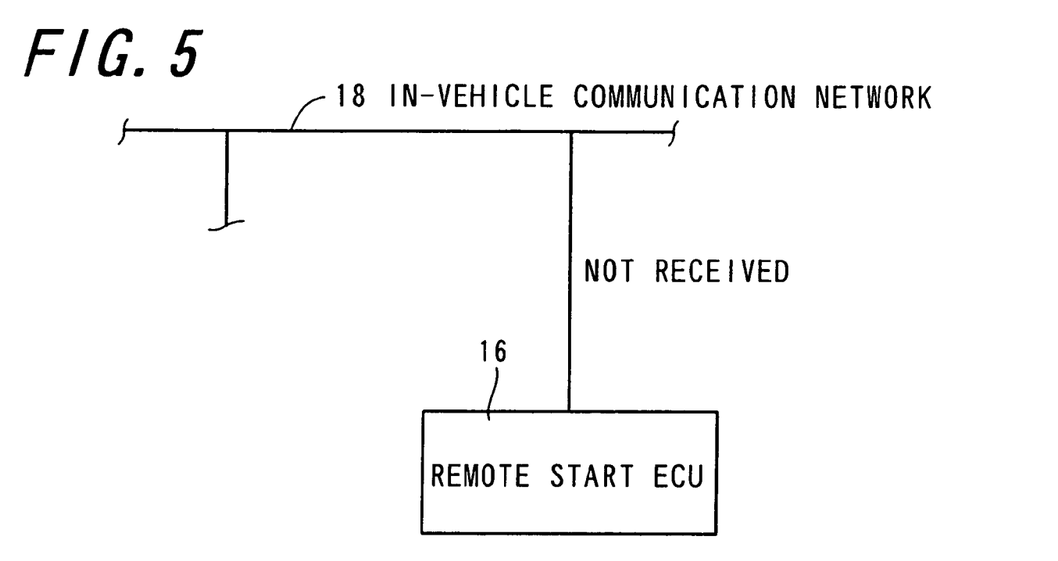
FIG. 5 is a view showing the remote start ECU connected to the in-vehicle communication network.
Figure 6:
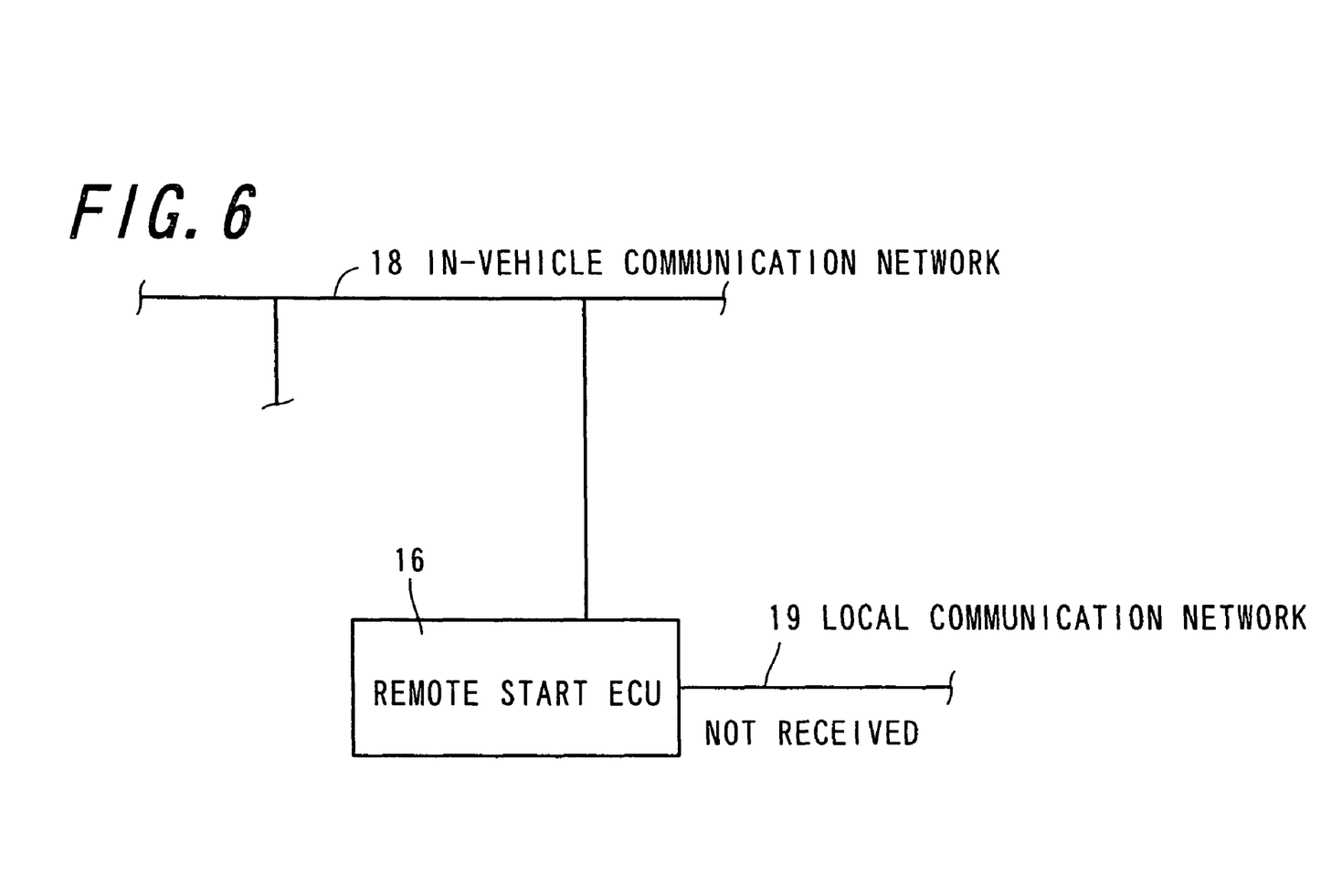
FIG. 6 is a view showing the remote start ECU connected to the in-vehicle communication network and the local communication network.

Now, described will be a method that the immobilizer type identification part 16*b* of the remote start ECU 16 judges whether the immobilizer device is provided in the vehicle or not and judges the type of the immobilizer device provided in the vehicle. FIG. 3 is a view showing the immobilizer-installed body ECU 13 and the remote start ECU 16, which are connected through the in-vehicle communication network 18. FIG. 4 is a view showing the remote start ECU 16 and the immobilizer ECU 24, which are connected through the local communication network 19. FIG. 5 is a view showing the remote start ECU 16 connected to the in-vehicle communication network 18. FIG. 6 is a view showing the remote start ECU 16 connected to the in-vehicle communication network 18 and the local communication network 19.

When the remote start ECU 16 receives an in-vehicle communication signal 31 sent from the immobilizer-installed body ECU 13 through the in-vehicle communication network 18, as shown in FIG. 3, in the case where the registration mode is set by means of the processing part 16*d* of the remote start ECU 16, the immobilizer type identification part 16*b* judges that the immobilizer-installed body ECU 13, which functions as the immobilizer device, is provided in the vehicle and that the immobilizer device provided in the vehicle is an immobilizer device for vehicle with push start smart system.

When the remote start ECU 16 receives a local communication signal 32 sent from the immobilizer ECU 24 through the local communication network 19, as shown in FIG. 4, in the case where the registration mode is set by means of the processing part 16*d* of the remote start ECU 16, the immobilizer type identification part 16*b* judges that the immobilizer ECU 24, which functions as the immobilizer device, is provided in the vehicle and that the immobilizer device provided in the vehicle is an immobilizer device for vehicle without push start smart system.

In the case where the registration mode is set by means of the processing part 16*d* of the remote start ECU 16, when the remote start ECU 16 connected to the in-vehicle communication network 18 receives no in-vehicle communication signal 31 through the in-vehicle communication network 18 within a predetermined time period, as shown in FIG. 5, and when the remote start ECU 16 connected to the in-vehicle communication network 18 and the local communication network 19 receives no local communication signal 32 through the local communication network 19 within a predetermined time period, as shown in FIG. 6, the immobilizer type identification part 16*b* judges that the remote start ECU 16 is not electrically connected with the immobilizer device, in other words, that the immobilizer device is not provided in the vehicle.

Figure 7A:
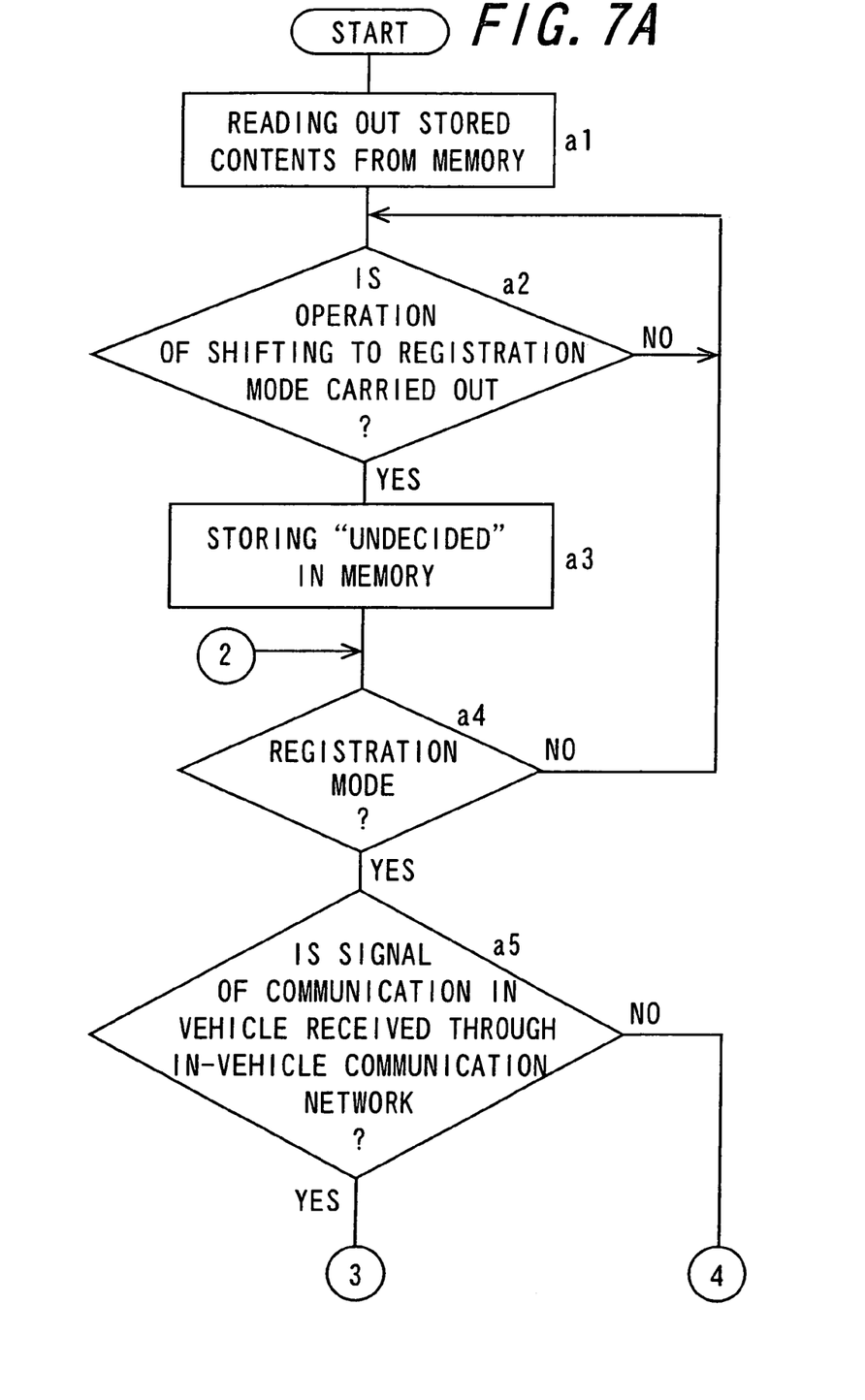
FIGS. 7A, 7B, 8A and 8B are flowcharts showing a processing procedure of the remote start ECU, the processing procedure related to steps of outputting a result of judgment by the immobilizer type identification part.
Figure 7B:
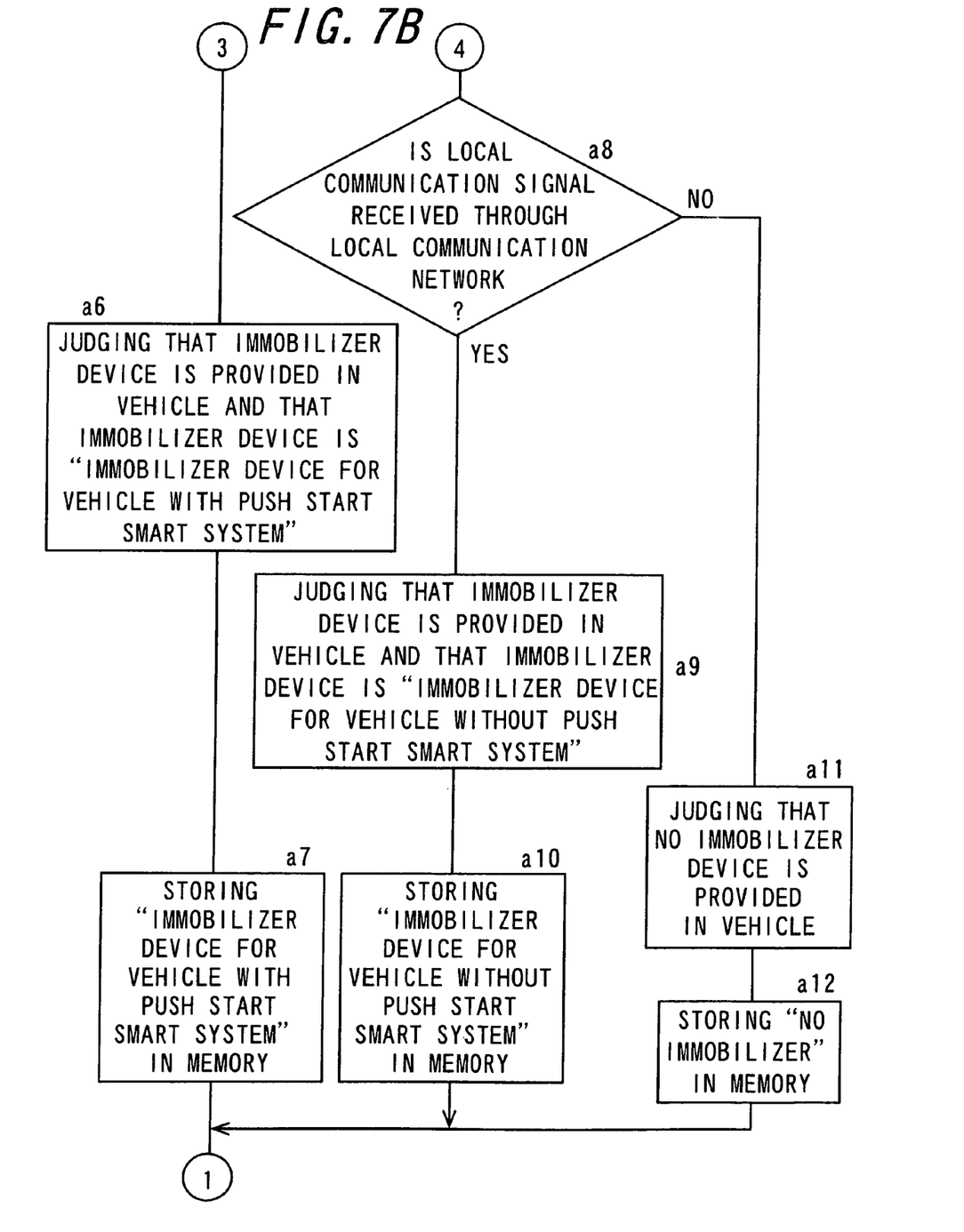

FIGS. 7A, 7B, 8A and 8 are flowcharts showing a processing procedure of the remote start ECU 16, the processing procedure relating to steps of outputting a result of judgment by the immobilizer type identification part 16b. In the flowcharts shown in FIGS. 7A and 7B, the procedure starts on condition that the power supplied from a vehicle power supply part (not shown) causes the remote start ECU 16 to be activated. In the flowcharts shown in FIGS. 8A and 8B, the procedure starts when any one of Steps a7, a10 and a12 in the flowchart shown in FIG. 7B is completed.

In Step a1, the remote start ECU 16 reads out current contents of storage, concretely, information indicating a type of the immobilizer device from the immobilizer type memory 16a to go to Step a2. In the immobilizer type memory 16a, stored is undecided information when the procedure is executed for the first time.

In Step a2, the control part of the remote start ECU 16 judges whether an operation of shifting from the ordinary operation mode to the registration mode has been carried out or not. The procedure goes to Step a3 in the case where the operation of shifting the mode has been carried out. The procedure stands by until the operation of shifting the mode has been performed when no operation of shifting the mode has been carried out. The operation of shifting the mode is an operation carried out by an operator who performs an operation for mounting the remote start ECU 16 onto the vehicle in a factory or the like. The operation of shifting the mode includes an operation of inserting and pulling the key 4 into and from the key cylinder 25, an operation of opening and closing a door and such. When the operation of shifting the mode is carried out in Step a2, the processing part 16d of the remote start ECU 16 sets the registration mode.

In Step a3, the control part of the remote start ECU 16 stores the undecided information in the immobilizer type memory 16a to initialize the immobilizer type memory 16a. The procedure goes to Step a4 after the processing in Step a3 is completed.

In Step a4, the control part of the remote start ECU 16 judges whether the registration mode is set or not. The procedure goes to Step a5 in the case where the registration mode is set. The procedure returns to Step a2 in the case where the registration mode is not set.

In Step a5, the control part of the remote start ECU 16 judges whether the in-vehicle communication signal 31 sent from the immobilizer-installed body ECU 13 through the in-vehicle communication network 18 is received or not. The procedure goes to Step a6 when the signal is received. The procedure goes to Step a7 when no signal is received.

In Step a6, which is a judging step, the immobilizer type identification part 16b judges that the immobilizer-installed body ECU 13 functioning as the immobilizer device is provided in the vehicle and that the immobilizer device provided in the vehicle is an immobilizer device for vehicle with push start smart system. The procedure then goes to Step a7.

In Step a7, the control part of the remote start ECU 16 stores "the immobilizer device for vehicle with push start smart system" in the immobilizer type memory 16a as a type of the immobilizer device provided in the vehicle. The procedure goes to Step b1 in the flowchart shown in FIG. 8A after the processing of Step a7 is completed.

In step a8, the control part of the remote start ECU 16 judges whether the local communication signal 32 sent from the immobilizer ECU 24 through the local communication network 19 is received or not. The procedure goes to Step a9 when the signal is received. The procedure goes to Step a11 when the signal is not received.

In Step a9, which is a judging step, the immobilizer type identification part 16b judges that the immobilizer ECU 24 functioning as the immobilizer device is provided in the vehicle and that the immobilizer device provided in the vehicle is an immobilizer device for vehicle without push start smart system. The procedure then goes to Step a10.

In Step a10, the control part of the remote start ECU 16 stores "the immobilizer device for vehicle without push start smart system" in the immobilizer type memory 16a as a type of the immobilizer device provided in the vehicle. The procedure goes to Step b1 in the flowchart shown in FIG. 8A after the processing in Step a10 is completed.

In Step a11, which is a judging step, the immobilizer type identification part 16b judges that no immobilizer device is provided in the vehicle. The procedure then goes to Step a12. In Step a12, the control part of the remote start ECU 16 stores "no immobilizer" in the immobilizer type memory 16a as the information indicating that no immobilizer device is provided in the vehicle. The procedure goes to Step b1 in the flowchart shown in FIG. 8A after the processing in Step a12 is completed.

Figure 8A:
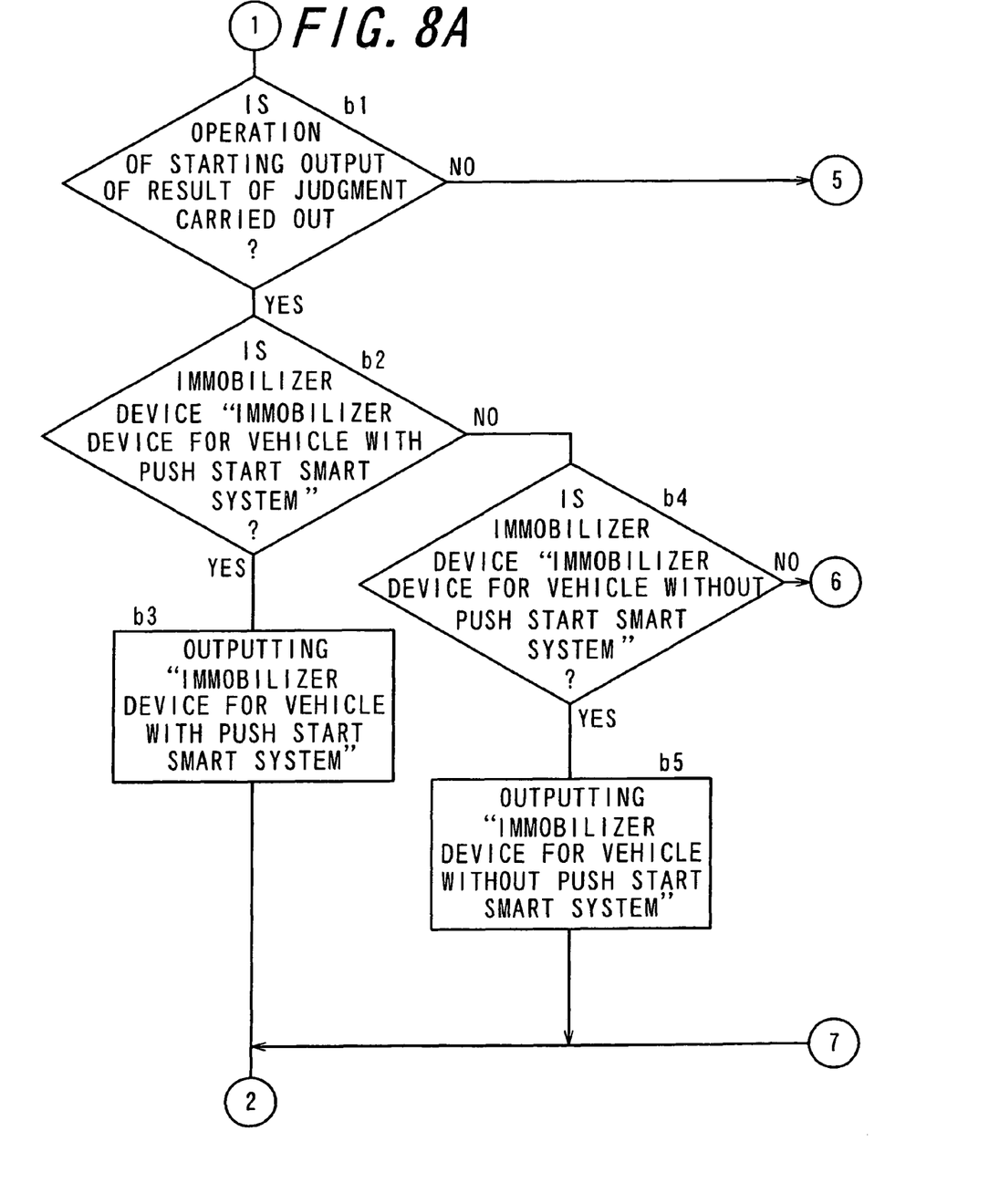

In Step b1, the control part of the remote start ECU 16 judges whether an operation of starting an output of the result of judgment by the immobilizer type identification part 16b is carried out or not. The procedure goes to Step b2 in the case where the operation of starting the output is carried out. The procedure returns to Step a4 in the flowchart shown in FIG. 7A in the case of no operation of starting the output. The operation of starting the output is, for example, an operation of starting the engine by an operator who performs an operation of mounting the remote start ECU 16 onto the vehicle in a factory or the like. The operation of starting the engine includes an operation of the push switch, an operation of turning the key and such.

In Step b2, the control part of the remote start ECU 16 judges whether the immobilizer device provided in the vehicle is an immobilizer device for vehicle with push start smart system or not based on the type of the immobilizer device stored in the immobilizer type memory 16a. In the case where the immobilizer device provided in the vehicle is an immobilizer device for vehicle with push start smart system, the procedure goes to Step b3. The procedure goes to Step b4 in the case where the immobilizer device provided in the vehicle is not an immobilizer device for vehicle with push start smart system.

In Step b3, which is an output step, the immobilizer type output part 16c outputs information indicating that the type of the immobilizer device provided in the vehicle is "the immobilizer device for vehicle with push start smart system" to the immobilizer-installed body ECU 13 through the in-vehicle communication network 18 as a result of judgment made by the immobilizer type identification part 16b.

The immobilizer-installed body ECU 13 reports the result of the judgment given by the remote start ECU 16 through the in-vehicle communication network 18, concretely, the information indicating that the type of the immobilizer device provided in the vehicle is "the immobilizer device for vehicle with push start smart system" to an operator carrying out an operation of mounting the remote start ECU 16 onto the vehicle by blinking an emergency blinking indication lamp provided in the vehicle by the predetermined number of times or by outputting sound at predetermined time intervals by means of an alarming horn provided in the vehicle, for example. This allows the fact that the immobilizer device provided in the vehicle is the immobilizer device for vehicle with push start smart system to be clearly recognized by the operator. The procedure returns to Step a4 in the flowchart shown in FIG. 7A after the processing of Step b3 is completed.

In Step b4, the control part of the remote start ECU 16 judges whether the immobilizer device provided in the vehicle is an immobilizer device for vehicle without push start smart system or not based on the type of the immobilizer device stored in the immobilizer type memory 16a. In the case where the immobilizer device provided in the vehicle is an immobilizer device for vehicle without push start smart system, the procedure goes to Step b5. The procedure goes to Step b6 in the case where the immobilizer device provided in the vehicle is not an immobilizer device for vehicle without push start smart system.

In Step b5, which is an output step, the immobilizer type output part 16c outputs information indicating that the type of the immobilizer device provided in the vehicle is "the immobilizer device for vehicle without push start smart system" to the body ECU 23 through the in-vehicle communication network 18 as a result of judgment made by the immobilizer type identification part 16b.

The body ECU 23 reports the result of the judgment given by the remote start ECU 16 through the in-vehicle communication network 18, concretely, information indicating that the type of the immobilizer device provided in the vehicle is "the immobilizer device for vehicle without push start smart system" to an operator carrying out an operation of mounting the remote start ECU 16 onto the vehicle by blinking an emergency blinking indication lamp provided in the vehicle by the predetermined number of times or by outputting sound at predetermined time intervals by means of an alarming horn provided in the vehicle, for example.

The number of blinks of the emergency blinking indication lamp and the time intervals at which the sound is outputted from the alarming horn are made different from the case of reporting that the type of the immobilizer device provided in the vehicle is the immobilizer device for vehicle with push start smart system to the operator. This allows the fact that the immobilizer device provided in the vehicle is the immobilizer device for vehicle without push start smart system to be clearly recognized by the operator. The procedure returns to Step a4 in the flowchart shown in FIG. 7A after the processing of Step b5 is completed.

Figure 8B:
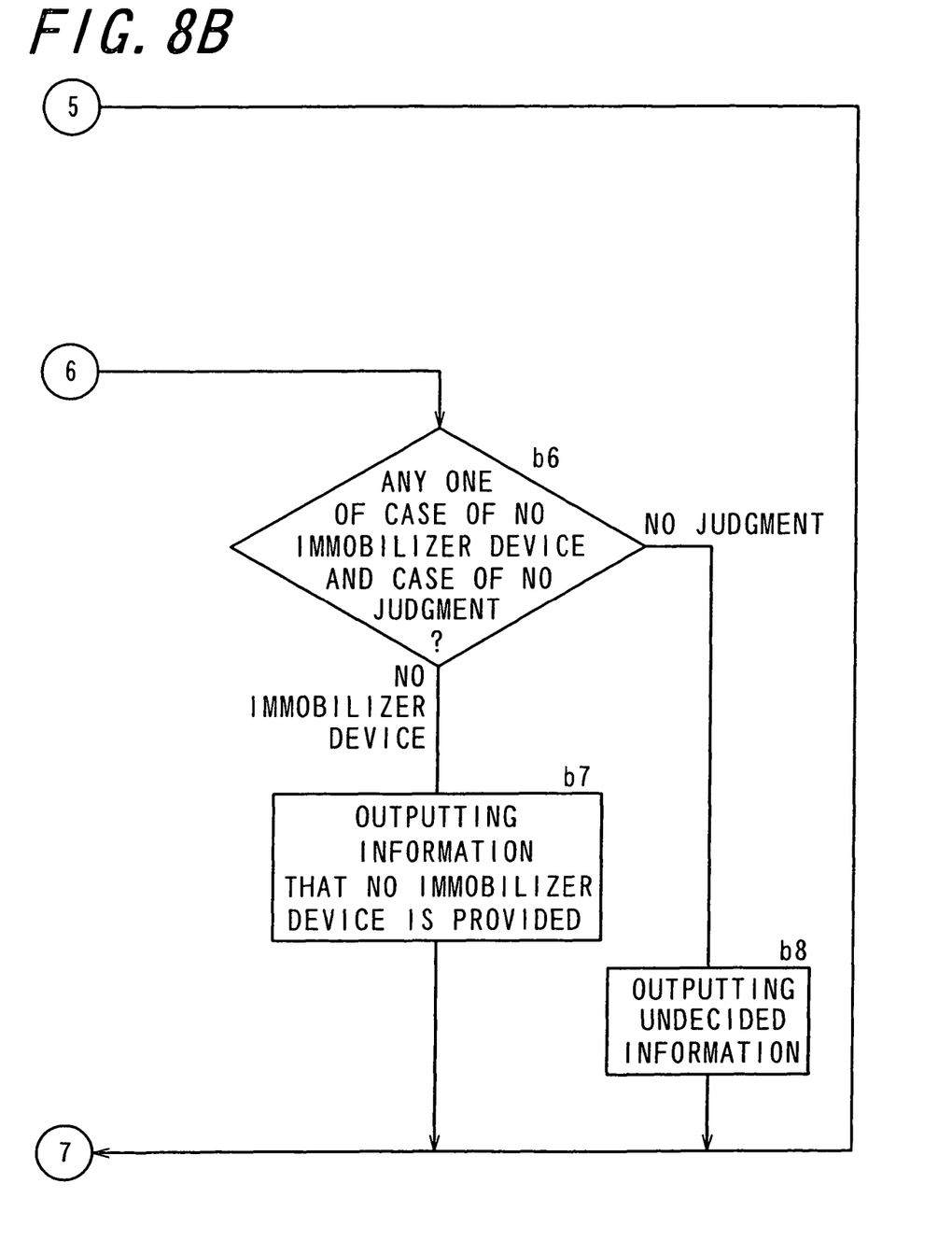

In Step b6, the control part of the remote start ECU 16 judges which the case is, the case of no immobilizer device provided in the vehicle or the case where the immobilizer identification part 16b has not yet carried out the judgment, based on the contents stored in the immobilizer type memory 16a. The procedure goes to Step b7 in the case of judgment of no immobilizer device. In the case of judgment that the immobilizer identification part 16b has not yet carried out the judgment, the procedure goes to Step b8.

In Step b7, which is an output step, the immobilizer type output part 16c outputs information indicating that no immobilizer device is provided in the vehicle to the immobilizer-installed body ECU 13 or the body ECU 23 through the in-vehicle communication network 18 as a result of judgment made by the immobilizer type identification part 16b.

The immobilizer-installed body ECU 13 or the body ECU 23 reports the result of the judgment given by the remote start ECU 16 through the in-vehicle communication network 18, concretely, the information indicating that no immobilizer device is provided in the vehicle to an operator carrying out an operation of mounting the remote start ECU 16 onto the vehicle by blinking an emergency blinking indication lamp provided in the vehicle by the predetermined number of times or by outputting sound at predetermined time intervals by means of an alarming horn provided in the vehicle, for example.

The number of blinks of the emergency blinking indication lamp and the time intervals at which the sound is outputted from the alarming horn are made different from the case of reporting that the type of the immobilizer device provided in the vehicle is the immobilizer device for vehicle with push start smart system to the operator and the case of reporting that the type of the immobilizer device provided in the vehicle is the immobilizer device for vehicle without push start smart system to the operator. This allows the fact that no immobilizer device is provided in the vehicle to be clearly recognized by the operator. The procedure returns to Step a4 in the flowchart shown in FIG. 7A after the processing of Step b7 is completed.

In Step b8, which is an output step, the immobilizer type output part 16c outputs judgment whether the immobilizer device is provided in the vehicle or not, the judgment made by the immobilizer type identification part 16b, and the undecided information indicating that the type of the immobilizer device has not yet judged to the immobilizer-installed body ECU 13 or the body ECU 23 through the in-vehicle communication network 18.

The immobilizer-installed body ECU 13 or the body ECU 23 reports the undecided information given by the remote start ECU 16 through the in-vehicle communication network 18 to an operator carrying out an operation of mounting the remote start ECU 16 onto the vehicle by blinking an emergency blinking indication lamp provided in the vehicle by the predetermined number of times or by outputting sound at predetermined time intervals by means of an alarming horn provided in the vehicle, for example.

The number of blinks of the emergency blinking indication lamp and the time intervals at which the sound is outputted from the alarming horn are made different from the case of reporting that the type of the immobilizer device provided in the vehicle is the immobilizer device for vehicle with push start smart system to the operator, the case of reporting that the type of the immobilizer device provided in the vehicle is the immobilizer device for vehicle without push start smart system to the operator and the case of reporting that no immobilizer device is provided in the vehicle to the operator.

This allows the fact that the immobilizer type identification part 16b has not yet carried out the judgment whether the immobilizer device is provided in the vehicle or not and the judgment of the type of the immobilizer device to be clearly recognized by the operator. The procedure returns to Step a4 in the flowchart shown in FIG. 7A after the processing of Step b8 is completed.

Now, described will be an operation of registering the identification code to the remote start ECU 16 by the operator. The operator recognizes the type of the immobilizer device provided in the vehicle to carry out an operation of registering the identification code for certification with the remote key 3 to the remote start ECU 16 or an operation of registering the identification code for certification with the key 4 to the remote start ECU 16.

In the operation of registering the identification code for certification with the remote key 3 to the remote start ECU 16, an electronic device arranged so as to be able to input information indicating an instruction to an on-vehicle system is first mounted onto the on-vehicle system 1. The electronic device is then operated to give the on-vehicle system 1 an instruction to send a signal for requesting to send the identification code to the immobilizer-installed body ECU 13.

Such an operation carried out by the operator causes the signal for requesting to send the identification code for certification with the remote key 3 to be sent from the remote start ECU 16 to the immobilizer-installed body ECU 13. The identification code is sent to the remote start ECU 16 by means of the immobilizer-installed body ECU 13 receiving the signal for requesting to send the identification code. This causes the identification code sent from the immobilizer-installed body ECU 13 to the remote start ECU 16 to be stored in a non-volatile memory (not shown) of the remote start ECU 16. In other words, the identification code for carrying out certification with the remote key 3 is registered to the remote start ECU 16.

In the operation of registering the identification code for certification with the key 4 to the remote start ECU 16, carried out is a predetermined vehicle operation, concretely, an operation of opening and closing a door, an operation of inserting and pulling the key into and from the key cylinder and the like.

Such an operation carried out by the operator causes the identification code for certification with the key 4 to be sent from the immobilizer ECU 24 to the remote start ECU 16. This causes the identification code sent from the immobilizer ECU 24 to the remote start ECU 16 to be stored in a non-volatile memory (not shown) of the remote start ECU 16. In other words, the identification code for carrying out certification with the key 4 is registered to the remote start ECU 16.

As described above, in accordance with the embodiment, the immobilizer type output part 16*c* outputs the information indicating that no immobilizer device is provided in the vehicle to the immobilizer-installed body ECU 13 or the body ECU 23 through the in-vehicle communication network 18 when the immobilizer type identification part 16*b* of the remote start ECU 16 judges that no immobilizer device is provided in the vehicle. Further, the immobilizer output part 16*c* outputs the information indicating the type of the immobilizer device to the immobilizer-installed body ECU 13 or the body ECU 23 through the in-vehicle communication network 18 when the immobilizer type identification part 16*b* judges that the immobilizer device is provided in the vehicle.

In the embodiment, any information among the information indicating the type of the immobilizer device provided in the vehicle, the information indicating that no immobilizer is provided in the vehicle and the undecided information is reported to an operator by blinking an emergency blinking lamp by means of the immobilizer-installed body ECU 13 or the body ECU 23, outputting sound from the alarming horn or the like.

Accordingly, the operator can clearly recognize the type of the immobilizer device provided in the vehicle and recognize that no immobilizer device is provided in the vehicle and that judgment whether the immobilizer device is provided in the vehicle or not and judgment of the type of the immobilizer device are not carried out, based on the number of blinks of the emergency blinking indication lamp, the time intervals at which the sound is outputted from the alarming horn or the like.

This allows the operator not to be required in mounting the remote start ECU 16 to the vehicle to carry out an operation of confirming whether the immobilizer device is provided in the vehicle or not and the type of the immobilizer device provided in the vehicle, namely, a structure of the vehicle such as a push start type immobilizer device and a turning type immobilizer device, for example, made reference to a specification of the vehicle and such, differently from the case of the conventional technologies. Accordingly, it can be prevented from occurring as soon as possible that the operator recognizes a wrong structure of the vehicle such as a type of the immobilizer device in error. This allows the operator to be prevented from carrying out in error a wrong operation predetermined in accordance with registration of an identification code to the remote start ECU 16 to undesirably impose a burden on the vehicle.

The embodiment is only an exemplification of the invention and may be changed in structure within a scope of the invention. For example, the embodiment is arranged so that, in an operation of registering an identification code for certification with the remote key 3 to the remote start ECU 16, an electronic device would be mounted to the on-vehicle system 1, and then, the electronic device would be operated to give the on-vehicle system 1 an instruction for sending a sending request signal of the identification code to the immobilizer-installed body ECU 13. Further, it is arranged that the predetermined vehicle operation be carried out in an operation for registering the identification code for carrying out certification with the key 4 to the remote start ECU 16. The structure, however, is not limited to the above.

In another embodiment of the invention, the remote start ECU 16 per se may be arranged to obtain the identification code for carrying out certification with the remote key 3 from the immobilizer-installed body ECU 13 when the remote start ECU 16 recognizes the type of the immobilizer device in an operation of registering the identification code for carrying out certification with the remote key 3 to the remote start ECU 16.

Moreover, in further another embodiment of the invention, the remote start ECU 16 per se may be arranged to obtain the identification code for carrying out certification with the key 4 from the immobilizer ECU 24 when the remote start ECU 16 recognizes the type of the immobilizer device in the operation of registering the identification code for certification with the key 4 to the remote start ECU 16.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A starting control apparatus for carrying out starting control of a vehicle, comprising:
   a judging portion which judges whether an immobilizer device which controls permission of starting of an engine based on verification of a specific identification code is provided in the vehicle or not, and, when it is judged that the immobilizer device is provided in the vehicle, judging the type of the immobilizer device provided in the vehicle; and
   an output portion which outputs information indicating that the immobilizer device is not provided in the vehicle when the judging portion judges that no immobilizer device is provided in the vehicle and outputs information indicating the type of the immobilizer device when it is judged in the judging portion that the immobilizer device is provided in the vehicle,
   wherein the judging portion judges the type of the immobilizer device based on whether the starting control apparatus receives a signal sent from the immobilizer device through an in-vehicle communication network connected to an electronic device for controlling the engine or through a local communication network unconnected to the electronic device.

2. The starting control apparatus of claim 1, further comprising: a control portion which causes setting of the immobilizer device to a registration mode that a predetermined identification code of the immobilizer device is registered, wherein in the case where the immobilizer device is in the registration mode under control of the control portion, when an in-vehicle communication signal sent from the immobilizer device through an in-vehicle communication network connected to the electronic device for controlling the engine is received by the starting control apparatus, the judging portion judges that the immobilizer device is of a type that starting of the engine is permitted when an identification code obtained from a mobile terminal is accorded with the predetermined identification code.

3. The starting control apparatus of claim 1, further comprising: a control portion which causes setting of the immobilizer device to a registration mode that a predetermined identification code of the immobilizer device is registered, wherein in the case where the immobilizer device is in the registration mode under control of the control portion, when a local communication signal sent from the immobilizer device through a local communication network provided in the vehicle independently from the electronic device for controlling the engine is received by the starting control apparatus, the judging portion judges that the immobilizer device is of a type that starting of the engine is permitted when an identification code obtained from a key of the vehicle is accorded with the predetermined identification code.

4. The starting control apparatus of claim 1, further comprising: a control portion which causes setting of the immobilizer device to a registration mode that a predetermined identification code of the immobilizer device is registered, wherein in the case where the immobilizer device is in the registration mode under control of the control portion, when any one of an in-vehicle communication signal sent from the immobilizer device through an in-vehicle communication network connected to an electronic device for controlling the engine and a local communication signal sent from the immobilizer device through a local communication network provided in the vehicle independently from the electronic device for controlling the engine is not received within a predetermined period of time, the judging portion judges that no immobilizer device is provided in the vehicle.

5. A starting control method for carrying out starting control of a vehicle, comprising:
a judging step of judging whether an immobilizer device for controlling permission of starting of an engine based on verification of a specific identification code is provided in the vehicle or not, and, when it is judged that the immobilizer device is provided in the vehicle, judging a type of the immobilizer device provided in the vehicle; and
an output step of outputting information indicating that the immobilizer device is not provided in the vehicle when it is judged in the judging step that no immobilizer device is provided in the vehicle, and outputting information indicating the type of the immobilizer device when it is judged in the judging step that the immobilizer device is provided in the vehicle,
wherein the judging step comprises:
(a) a step of receiving a signal sent from the immobilizer device by a starting control apparatus; and
(b) a step of judging a type of the immobilizer device based on whether the starting control apparatus receives the signal sent from the immobilizer device at the step (a) through an in-vehicle communication network connected to an electronic device for controlling the engine or through a local communication network unconnected to the electronic device.

6. The starting control apparatus of claim 1, wherein the starting control apparatus requires permission of starting of the engine of the immobilizer device in response to a request signal sent from a remote key by radio communication, and controls starting of the engine in the case where the immobilizer device gives permission of starting of the engine.

7. The starting control apparatus of claim 1, wherein the starting control apparatus is additionally mounted after the vehicle is sold.

8. The starting control method of claim 5, further comprising:
a step of requiring permission of starting of the engine of the immobilizer device in response to a request signal sent from a remote key by radio communication; and
a step of controlling starting of the engine in the case where the immobilizer device gives permission of starting of the engine.

9. The starting control method of claim 5, wherein the starting control apparatus is additionally mounted after the vehicle is sold.

* * * * *